United States Patent [19]
Fernandez

[11] Patent Number: 5,315,642
[45] Date of Patent: May 24, 1994

[54] CONCURRENT CREATION AND TRANSMISSION OF TEXT MESSAGES TO MULTIPLE PAGING SERVICES

[75] Inventor: Jorge D. Fernandez, Willowdale, Canada

[73] Assignee: Canamex Corporation, Markham, Canada

[21] Appl. No.: 869,190

[22] Filed: Apr. 16, 1992

[51] Int. Cl.⁵ .......................................... H04M 11/00
[52] U.S. Cl. .............................. 379/96; 340/825.44; 379/57
[58] Field of Search .................. 379/52, 93, 96–99, 379/57, 63; 340/311.1, 825.44; 455/38.1, 38.4; 370/94.1, 93; 343/718

[56] References Cited

U.S. PATENT DOCUMENTS 5,095,307 3/1992 Shimura et al. ................. 379/57
5,170,487 12/1992 Peek ............................. 340/825.44

Primary Examiner—Wing F. Chan
Attorney, Agent, or Firm—Mirek A. Waraksa

[57] ABSTRACT

A paging device sends text messages to pagers via paging services observing different communication protocols. Communication data is stored in random access memory and includes a service file identifying telephone numbers and protocols associated with each paging services and a pager file containing pager identification codes. Operator message creation and automatic transmission occur contemporaneously, coordinated with status fields in message records. Each newly-created message is stored in a queue together with control data identifying a paging service and pager and status data indicating a "pending" status, namely, a requirement for transmission of the message. The automatic transmission involves repeated scanning of the queue for pending messages, programming a modem according to the message's control data, and arranging transmission to the relevant service. The status of messages subject to transmission errors is automatically set to "rejected". The operator can retrieve any message from queue, setting its status from rejected to pending to reinitiate transmission or from pending to cancelled to suppress transmission. Communication data can also be transmitted to and received from an identical device in a remote service center, to allow correction of faulty communication data or reconfiguration to meet user requirements.

16 Claims, 13 Drawing Sheets

Fig. 7  Pager Data Entry
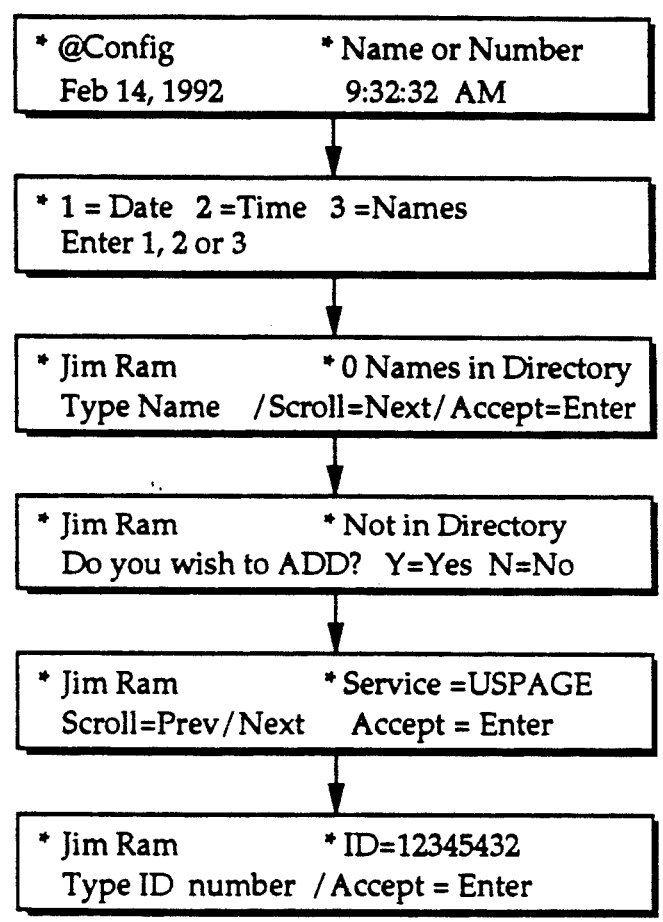
Fig. 8  Message Entry
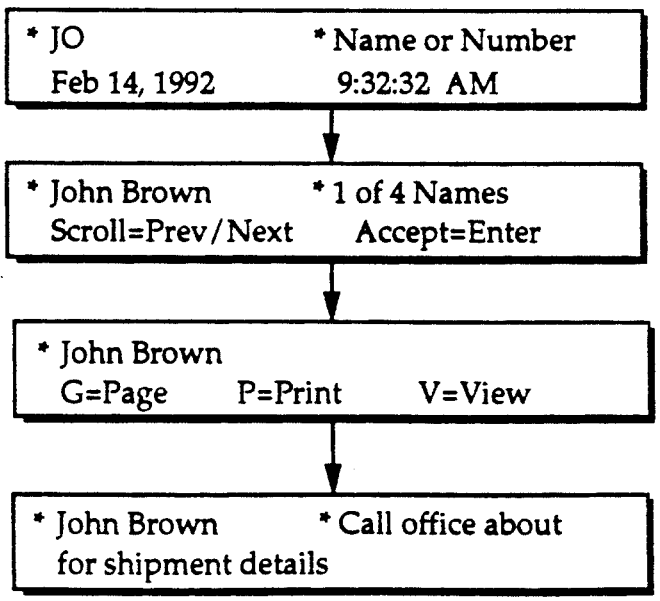

FIG. 9 Service Data Entry
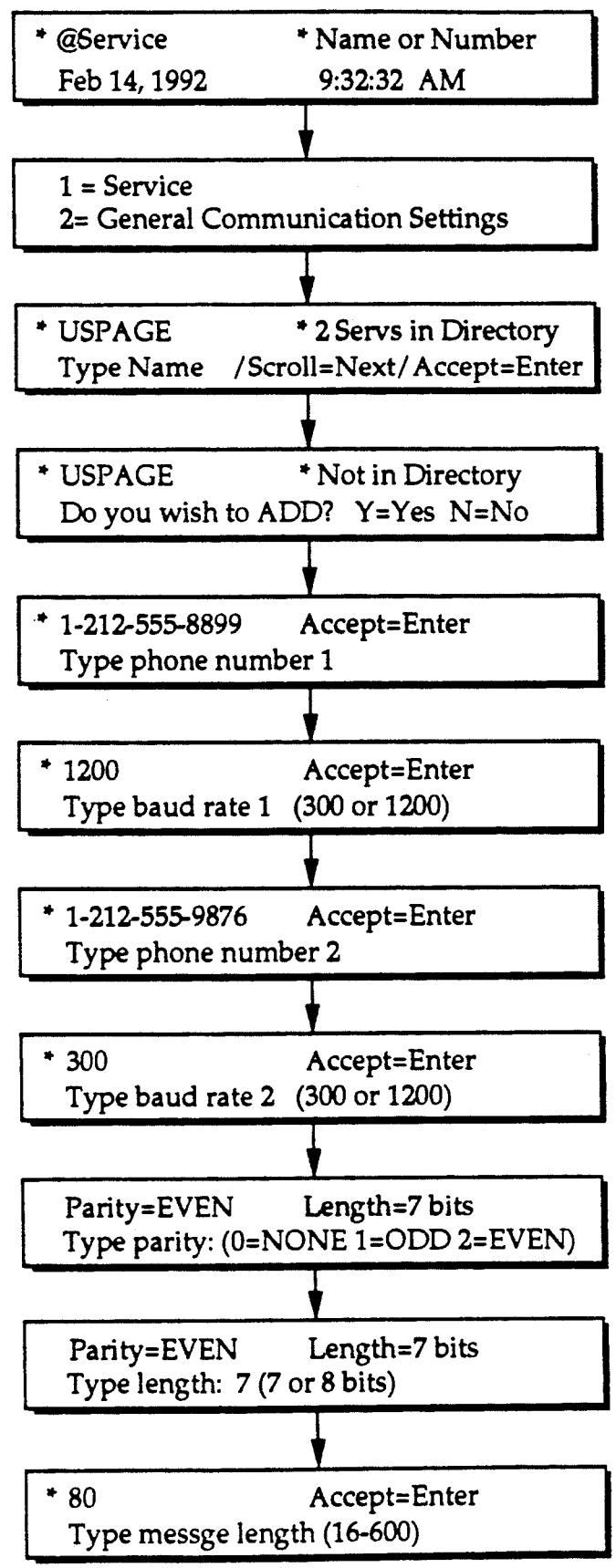

Fig. 12 Message Viewing
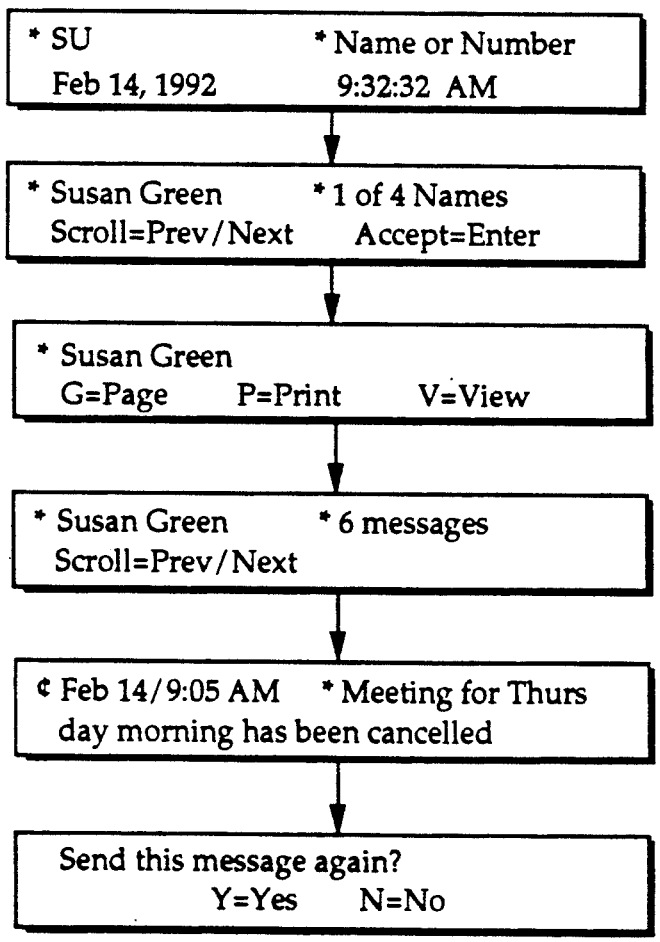

Fig. 15 Data-Receiving Mode
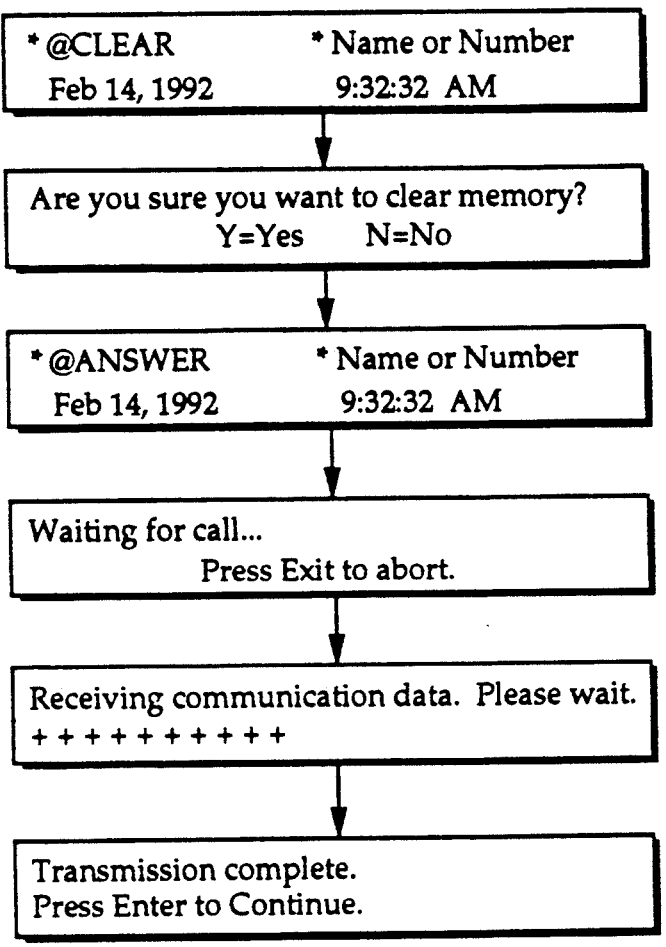
Fig. 16 Data-Transmitting Mode
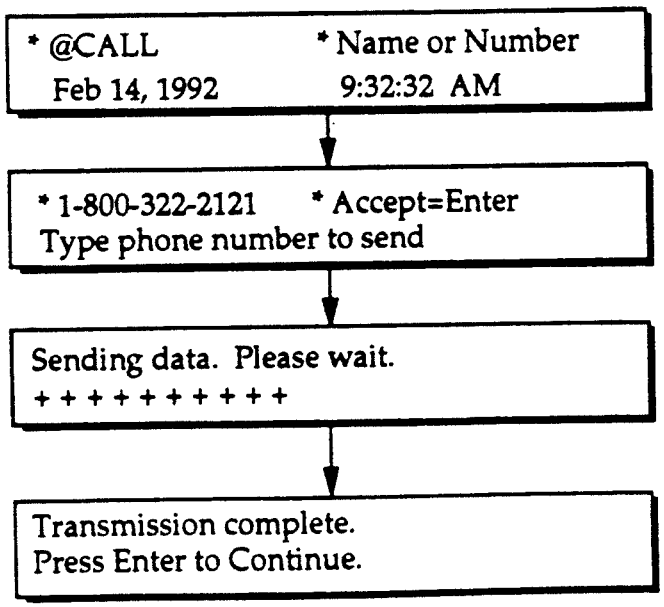

CONCURRENT CREATION AND TRANSMISSION OF TEXT MESSAGES TO MULTIPLE PAGING SERVICES

FIELD OF THE INVENTION

The invention relates generally to transmission of text messages (alphanumeric and other conventional characters) to pagers. More specifically, it relates to devices and methods for relaying such messages through paging services observing different communication protocols, transmission of message concurrently with operator creation and handling of messages, and to a variety of other enhancements to prior practices.

BACKGROUND OF THE INVENTION

A particular text-transmitting device has dominated the paging industry. That is the "Alphamate" distributed by Motorola Company. The Alphamate is a microprocessor-based device that stores pager data and messages in a random access memory. The pager data consists of the initials of pager users and the identification codes required by an associated paging service to communicate with the pagers. In a message-creating mode, an operator can compose a message on a display using a keyboard and can specify a pager for which the message is intended. The message together with the pager identification code is then added to a transmission queue of like messages in memory. In an entirely separate message-transmitting mode, the microprocessor dials a particular paging service through a modem and transmits all message in succession to the paging service. The messages are then immediately cleared from memory (except for the last-transmitted message), and the message-creating mode can be resumed.

There are several significant limitations to the prior device. It is adapted to communicate only with a single paging service. Unfortunately, paging services observe different communication protocols, including different baud rates, parity, word lengths, and maximum message lengths. A separate device would be required to handle communications with each paging service and would require connection to a separate telephone line. Also, the prior device does not allow concurrent message creation and transmission. While the device is in its message-transmitting mode, the operator is unable to compose and enter messages. Also, the transmission function of the prior device has significant limitations. The device essentially transmits the telephone number of the paging service, and after a period of time transmits its messages in succession. That occurs even when a busy signal is encountered, losing messages. Also retransmission of messages received garbled is not possible, except for the last message that has been transmitted and remains stored.

SUMMARY OF THE INVENTION

In one aspect, the invention provides a device for sending text messages to paging services observing different communication protocols. The device includes input means comprising a keyboard, a display, storage means for storing data in digital form, and a programmable modem. Control means, such as a microprocessor, are coupled to the input means, the display, the storage means and the modem. The control means are programmed to retrieve from the storage means certain communication data. The communication data comprises paging service data identifying the communication protocol observed by each paging service (including necessary modem configuration data) and at least one telephone number. It also comprises pager data identifying the paging service serving each of the pagers and the data required by the paging service to identify the pager for communication.

The control means control creation of a message essentially as follows. The operator is permitted to compose the message on the display and specify a particular pager. Transmission control data are generated in response to the user's specification of the particular pager and in response to the pager data associated with the particular pager. The transmission control data associates the message with the particular pager and the paging service serving the particular pager. The message is stored together with the transmission control data in a message queue maintained in the storage means.

The control means transmit each of the messages in the queue essentially as follows. The control means program the modem for communication with the paging service associated with the message. The programming of the modem is done in response to the transmission control data associated with the message, which identifies the associated paging service, and in response to the communication data in the storage means, which contains information regarding the communication protocol observed by the paging service. The controls means then communicate with the associated paging service to transfer both the message and data identifying the pager associated with the message.

The control means preferably provide an operator-controlled mode of operation and a concurrent automatic mode of operation controlling the transmission of messages. A conventional multitasking processor or multiple processors may be used. For the operator-controlled mode of operation, the control means store status data together with each of the composed messages indicating the current status of the message. The current status is one of a set of predetermined statuses including at least a transmit status (a requirement for transmission of a message) and a transmitted status (indicating that the message has be transmitted or that an attempt to transmit has been made). The operator is permitted to view stored messages on the display and to alter the status data of the stored messages, including altering a transmitted status to a transmit status. The control means are programmed for the automatic mode of operation to continually scan the message queue to locate messages whose status data indicates a transmit status, to transmit such messages via the modem, and to alter the status data of each of the messages in response to successful transmission of the message to identify a transmitted status. If a message is later identified by a pager user as having been received garbled, the operator can retrieve the transmitted message and alter the status data to once again indicate a transmit status, retransmission being controlled by the automatic mode of operation. Basically, message handling by the operator and transmission functions are coordinated by entering and altering status codes, allowing the two types of functions to occur concurrently without conflict.

The control means are preferably programmed to optimize message throughput. First, a message requiring transmission is selected, preferably the earliest created message. The transmission control data associated with the message are used to identify the associated paging service, and the modem is programmed for transmission to the particular paging service. A telephonic connection is completed between the modem and the particular paging service, and the selected message is transmitted. The order of the message queue is not observed. Instead, the control means identify other messages in the message queue whose transmission data identify the same paging service. These messages are transmitted during the single communication session involving transmission of the selected message, rather than logging off and proceeding to the next message in the message queue.

The device is preferably adapted to respond to busy signals in a particular manner. Several telephone numbers may be stored for communication with a particular paging services. The control means are adapted to control telephonic connection of the programmed modem with the particular service by selecting one of the telephone numbers. The selected telephone number is transmitted with the programmed modem over the telephone lines to initiate a telephonic connection. The control means detect through the modem whether a busy signal is generated on the telephone lines. In response to a busy signal, the controls decouple the modem from the telephone lines, and select a different telephone number for the particular paging services. This procedure is repeated a predetermined number of times and terminated if a telephonic connection is completed.

Communication data must of course be entered into the device. That can be done with conventional data entry routines. In the prior art, only data regarding a single paging service was required, and such data could be conveniently and reliably entered a single time by a knowledgeable installer. However, the present device will generally be configured to allow end-users to enter communication data for various paging services. They may have little familiarity with concepts of baud rate, parity, word length, and other aspects of communication protocols. There is consequently a greater likelihood of transmission problems owing to entry of faulty communication data. As well, if communication data is updated or reorganized only infrequently, the operator may not develop significant comfort with relevant data entry procedures.

Accordingly, in another aspect, the control means have a data-transmitting mode that is assumed in response to a predetermined operator command. In the data-transmitting mode, the control means are programmed to permit the user to specify a telephone number for a device adapted to receive communication data stored in the storage means and located, for example, at a service center. The modem is then telephonically connected to the service center device. The control means then retrieve the communication data from the storage means, and transmit the communication data according to a predetermined communication protocol to the service center device over telephone lines. The communication data, once received by the service center device, is "reconfigured" (corrected, reorganized or augmented) to address failures in communication attributable to faulty data entry or to meet user communication needs. The control means are also adapted to assume a data-receiving mode responsive to a predetermined command, in which the control means program the modem to receive communication data according to a predetermined communication protocol from the service center device and then store the received communication data for later retrieval in connection with the creation of messages. The service center device is telephonically connected to the user's device in the data-receiving mode, and the reconfigured communication data is transmitted back to the user's device for use.

Other aspects of the invention will be apparent from a description below of a preferred embodiment and will be more specifically defined in the appended claims.

DESCRIPTION OF THE DRAWINGS

The invention will be better understood with reference to drawings in which:

FIG. 7 is a sequence of screen layouts for pager data entry;

FIG. 8 is sequence of screen layouts for entry of messages;

FIG. 9 is a sequence of screen layouts for entry of paging service data;

FIG. 12 is a sequence of screen layouts for viewing messages in queue and modify certain status data associated with the messages;

FIG. 15 is a sequence of screen layouts for a data-receiving mode of the paging device; and, FIG. 16 is a sequence of screen layouts for a data-transmitting mode of the paging device;

DESCRIPTION OF PREFERRED EMBODIMENT

Figure 1:
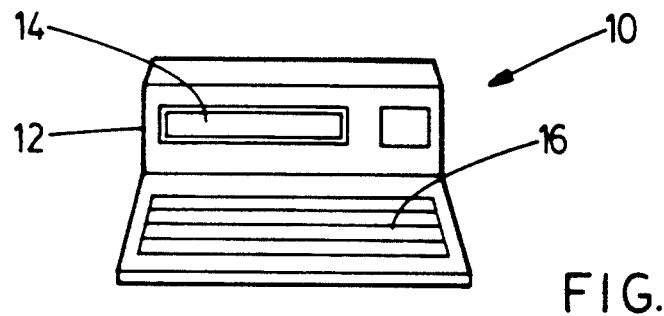
FIG. 1 is a diagrammatic representation of the external appearance of a paging device embodying the invention.
Figure 2:
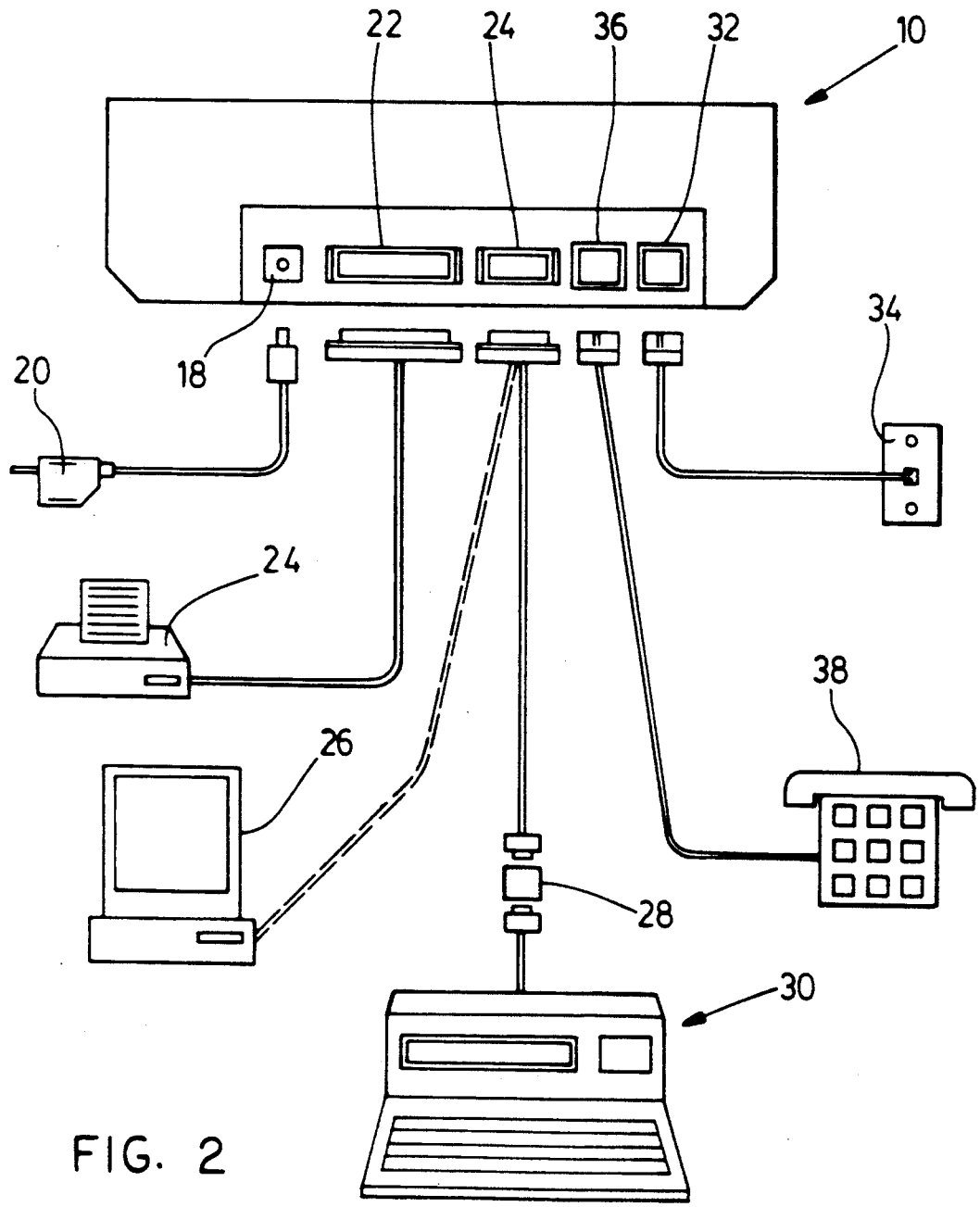
FIG. 2 is a diagrammatic representation of various ports and jacks at the back of the paging device, indicating how it may be connected to various external devices and lines.
Figure 3:
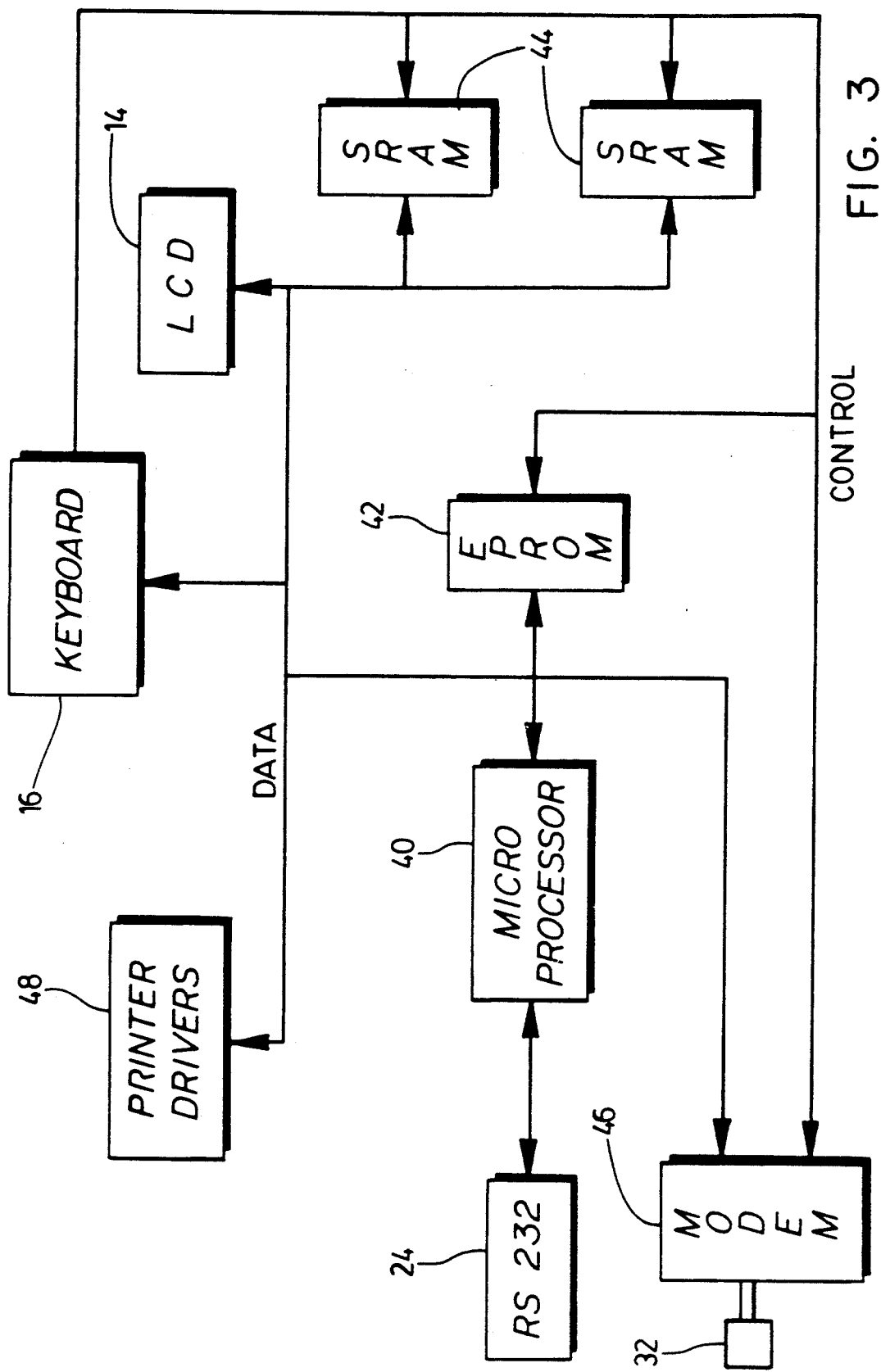
FIG. 3 is a schematic representation of the device.

Reference is made to FIGS. 1-3 which illustrate the various components of a paging device 10 embodying the invention. The device 10 comprises a housing 12 which contains a two-line liquid crystal display 14 (LCD) and a keyboard 16 of conventional construction. Several ports and jacks are mounted on the back of the device 10. These include a DC power input jack 18 which can be coupled by a standard AC/DC adaptor 20 to a AC power line. A conventional printer port 22 permits the device 10 to be connected to a printer. A standard RS-232 port 24 permits transfer of data to and from external devices, such as a personal computer 26 (optional connection shown in stippled outline) or through a null modem adaptor 28 to the RS-232 port (not illustrated) of a substantially identical paging device 30. A line jack 32 permits the device 10 to be coupled in a conventional manner to a phone line or PBX, as at a conventional wall jack 34. A telephone jack 36 permits a telephone 38 to be coupled to the same phone line or PBX when the device 10 is not otherwise communicating with paging services. This last aspect of the paging device 10 is a conventional practice with many devices adapted to connect to telephone lines 52 and will not be described further.

The principal components of the paging device 10 are apparent in FIG. 3. A microprocessor 40 controls the overall operation of the device 10. It is programmed by software code contained in an erasable programmable read only memory (EPROM) 42. Communication data and messages are stored in static random access memory (SRAM) 44. A conventional programmable modem 46 is used to couple the microprocessor 40 for telephonic communication with paging services, such as the services diagrammatically illustrated in FIG. 10. The modem 46 contains a processor (not illustrated) immediately controlling its operation in a conventional manner. A printer driver 48 couples the microprocessor 40 in a conventional manner to the printer port 22 to operate the printer. The device 10 may comprise a battery-operated back-up power supply (not illustrated) to preserve communication data and messages stored in SRAM 44 if power line voltage is temporarily interrupted.

Figure 14:
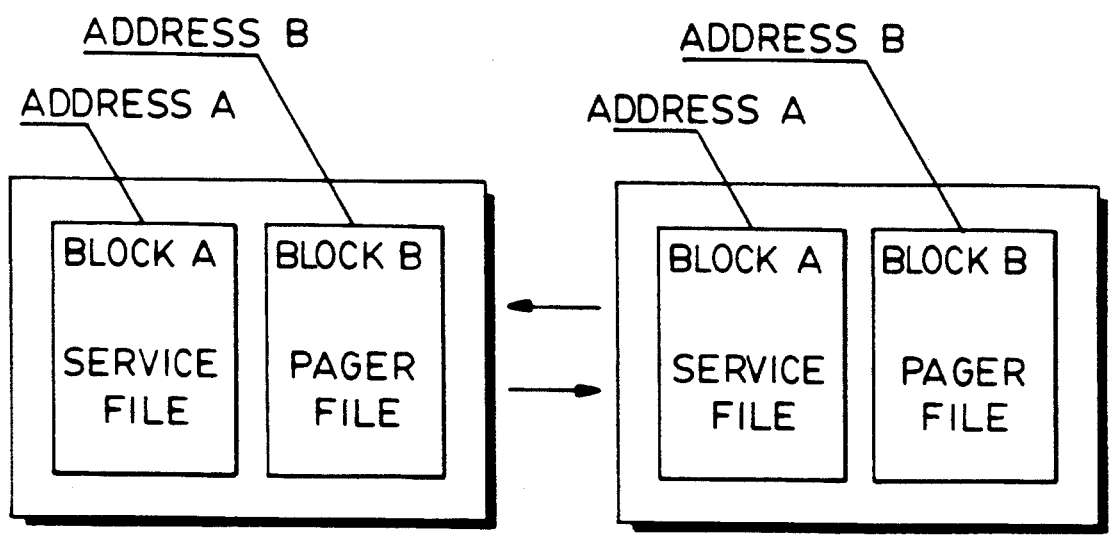
FIG. 14 diagrammatically illustrates how pager and paging service data files are located in memory, both in the paging device of FIG. 1 and the service center device.

Communication data are stored as files in the SRAM 44, as indicated in FIG. 14. These include a pager file and a paging service file. The pager file contains records identifying individual pagers. The service file contains records identifying particular paging services and containing data respecting their communication protocols.

Figure 4:
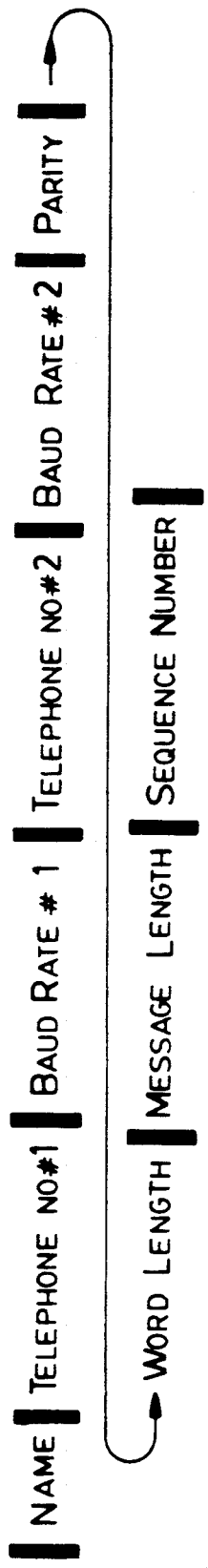
FIGS. 4-6 are schematic representations respectively of the structures of service file records, pager records, and message records maintained by the paging device.

Each record in the service file contains certain common fields, the record structure being illustrated in FIG. 4. These include a name field identifying the service, first and second telephone number fields, first and second baud rate fields, a parity field, a word length field, a message length field, and a sequence number field. The name field will normally contain the name of the service as the operator wishes to identify it. The telephone number fields contain alternative telephone numbers for contacting the service. Paging services often provide different baud rates associated with different telephone numbers, and accordingly corresponding baud rate fields are provided. A paging service will generally use common parity and word lengths regardless of baud rates offered. Accordingly, only single fields are provided to store the parity and word parameters required for communication with the particular service. The message length field contains the maximum length of any message that the particular service will accept. The data in these various fields will typically be entered by the operator using specifications provided by a particular paging service. The sequence number field is assigned a unique numeric value in a conventional manner, by the microprocessor 40 during record creation. That value is used to link pager records to particular pager services records, effectively associating each pager with a particular service. That value is also incorporated into messages at the time of creation to associate each message with a particular paging service. This permits later retrieval of paging service communication data for appropriate programming of the modem 46.

Figure 5:

The record structure of each record in the pager file is illustrated in FIG. 5. Each record includes a name field, a service field, and a pager ID field. The name field will normally contain the name of the pager user, information more meaningful to an operator than pager identification numbers. The service field contains the unique sequence number of the paging service record of the service associated with the pager. The pager ID field contains the pager number which the pager service associates with the pager.

The paging service and pager files are arranged in a particular manner in memory. Blocks of SRAM 44 of fixed size are assigned to each of the files, as illustrated in FIG. 14. Basically, a block A of SRAM 44 at a predetermined starting address A stores the paging service file. A block B of SRAM 44 at predetermined starting address B stores the pager file. The ending addresses are fixed by the size of the assigned memory blocks. The fields and records of these files are assigned fixed lengths. The records are essentially contiguous within the assigned memory blocks. Retrieval of records by the microprocessor 40 involves scanning through the memory blocks according to starting addresses, record lengths, and the block sizes. Individual items of data are retrieved from individual records by noting the predetermined field lengths. The records in each of the files are maintained in alphabetic order according to the relevant name field to simplify searching. The assignment of fixed blocks at known addresses has bearing on how the paging device 10 can be serviced remotely, a matter discussed more fully below.

Entry and editing of pager data will be described with reference to FIG. 7. The normal operating mode presented to the operator after start-up is message creation. The operator can enter a command such as "@Config". The operator is then presented with a screen providing configuration options, such as setting the date and time of the clock (not illustrated) associated with the microprocessor 40 or entering names (pager records). Upon entry of the numeric code associated with the names option, the operator is presented with a screen indicating the number of pagers recorded in the pager file. The operator enters the first letters of the name of a pager user, for example, as illustrated, "Jim Ram", and the microprocessor 40 initiates a search for pager file records satisfying the search criteria.

If no match is found, a data entry function is initiated. The screen layout is modified to ask whether a new file record is to be added. If the user types "Y" to confirm, a screen layout is presented to request the first required data, namely, the paging service that serves the individual's pager. A first paging service is indicated, and the microprocessor 40 effectively allows the user to scroll through the service file records by pressing previous and next keys associated with the keyboard 16. Once the desired service is displayed on the screen, the user can press the enter key of the keyboard 16 to associate the new pager with the particular paging service. The microprocessor 40 appropriately records the sequence number of the selected paging service record in the corresponding service field of the new pager file record. The microprocessor 40 then causes the next screen to be presented requesting the pager user's identification number. The number to be entered is the number assigned to the individual's pager by the particular paging service, and upon entry the value is appropriately recorded.

If pager records are found that match the search criteria, a data editing function is initiated. The operator is permitted to scroll with next and previous keys through the selection of pager records that have been located. Once a record is selected, the screen layout is modified to indicate an edit function, which is initiated by pressing the enter key. The microprocessor 40 can then step the user through the screen layouts used to enter a new record, displaying recorded values and allowing editing. Alternatively, menu choices can be provided identifying the particular field to be edited, and the operator can be directed immediately to a screen layout presenting the current value of the particular field and allowing editing of the field value.

Entry of paging service data will be described with reference to the sequence of screen layouts in FIG. 9. In the initial screen layout for message creation, the user enters a predetermined command such as "@SERVICE". The microprocessor 40 then presents a screen requesting the user to identify whether service file records or general communication data is to be accessed. The microprocessor 40 then presents a screen identifying the number of paging service records currently in SRAM 44, and the operator is permitted to scroll to a desired paging service record with next and previous keys. Alternatively, as illustrated, the operator can enter the name of a paging service, for example, as illustrated, "USPAGE". By entering a service name that the microprocessor 40 cannot locate, as with entry of pager data, a screen layout is presented requesting confirmation that a new service file record is to be created. The microprocessor 40 then presents a series of screen layout requesting a first telephone number for the new service. A special character such as a comma may be added to the end of the telephone number to indicate to the microprocessor 40 that a delay of several seconds should be allowed before dialing the number, essentially to obtain a dial tone. This accommodates use of the paging device 10 through a PBX. The screen is then modified to request entry of a baud rate, which at present is either 300 or 1200. The screen is then modified to request entry of a second telephone number, and then a second baud rate. These can be left blank if appropriate. A series of screens are then presented to gather other communication data, namely, parity, word length, and maximum message length. The new record now contains all communication data required to program the modem 46 to observe the communication protocols of the service. Editing of such records proceeds in a manner analogous to that of pager records. IXO TAP communication protocols govern other aspects of communication with paging services and are preprogrammed in the EPROM 42 for retrieval by the microprocessor 40.

General communication data can also be entered in a similar manner. Comparable entry screens collect data to set the number of attempts that should be made to connect to a paging service in response to busy signals or failure to obtain a carrier, delay time for detecting a carrier from the paging service, and delay time for detecting a response from the paging service during handshaking. If the specified delay periods are exceeded, a communication error is assumed.

Deletion of a record in either the pager file or the service file can be triggered by simply nulling the name field and pressing enter with an appropriate request for confirmation. It is desirable, however, to scan stored messages to ensure that deletion is inhibited if data associated with an existing message would be affected. Deletion should also be inhibited with respect to a paging service record, if a pager record is associated with the paging service record. That can be done in a conventional manner.

Message creation will be described with reference to a sequence of screen layouts in FIG. 8. In the initial screen for message creation, the operator enters the first letters of the name of the pager owner to whom the message is to be sent. The microprocessor 40 responds by searching through the pager file for each record satisfying the search criteria and displays a first record. The operator has the option of scrolling upwardly or downwardly through a list of the located records. It is assumed, however, that first record located, that of John Brown, identifies the desired pager. The operator then presses the enter key of the keyboard 16 to select the relevant pager. The operator is then presented with the option of selecting several functions, namely paging, printing the relevant user's stored messages, or viewing the messages for the selected pager that are in a message queue 50 in SRAM 44. To create a message, the operator selects the paging option. The operator is then presented with a screen allowing entry of the required message. Pressing the enter key causes the message to be recorded in the message queue 50. The particular message generated is identified with reference label M6 in FIG. 10.

Figure 6:

The message M6 is actually stored as a record containing not only the text of the message, but also status data and transmission control data. The message record structure is illustrated in FIG. 6. The message record may include the following fields: a pager ID field, a service field, a status field, a link field, a transmission date field, a transmission time field, an error message field, and a message field. The pager ID field contains the actual pager number used by a paging service. With respect to creation of the message M6, that data is automatically generated and recorded in response to the user's selection of the pager user. The service field contains the sequence number of the record in the service file of the paging service associated with the pager. That data is automatically generated from the corresponding field in the selected pager record. The status field can contain various numeric values, which may indicate the following message statuses: pending, sent, cancelled, or rejected. The pending status indicates a requirement for transmission. The sent status indicates that a message has been transmitted to an associated paging service. The cancelled status indicates that the operator has requested cancellation of transmission. The rejected status is recorded by the microprocessor 40 in response to a transmission error. The microprocessor 40 automatically sets the status to pending upon creation of the record. Each message when created is automatically flagged for transmission, which is a preferred form of operation, but not absolutely necessary. The link field is initially empty (zero-value), but will later contain a pointer to the address in SRAM 44 of the next message record created. The transmission time, date and error fields are left temporarily empty. The microprocessor 40 also updates the link field of stored message M5 to point to the address location of the new record M6.

The message queue 50 is maintained in accord with conventional concepts regarding linked lists. A predetermined address in SRAM 44 contains a queue pointer to the first message M1 in the queue 50. As described above, each message contains a link field pointing to the succeeding record in the queue 50. The last record M6 has a null-value in its link field, indicating the end of the queue 50. The records are naturally ordered according to time of creation.

The microprocessor 40 is multi-tasking. It provides two separate and concurrent modes of operation. One mode is operator-controlled which includes creating messages and altering status data to effect retransmission. The other mode is an automatic mode of operation controlling transmission of messages. How such separate modes of operation are coordinated to avoid conflicts will be discussed below.

Figure 10:
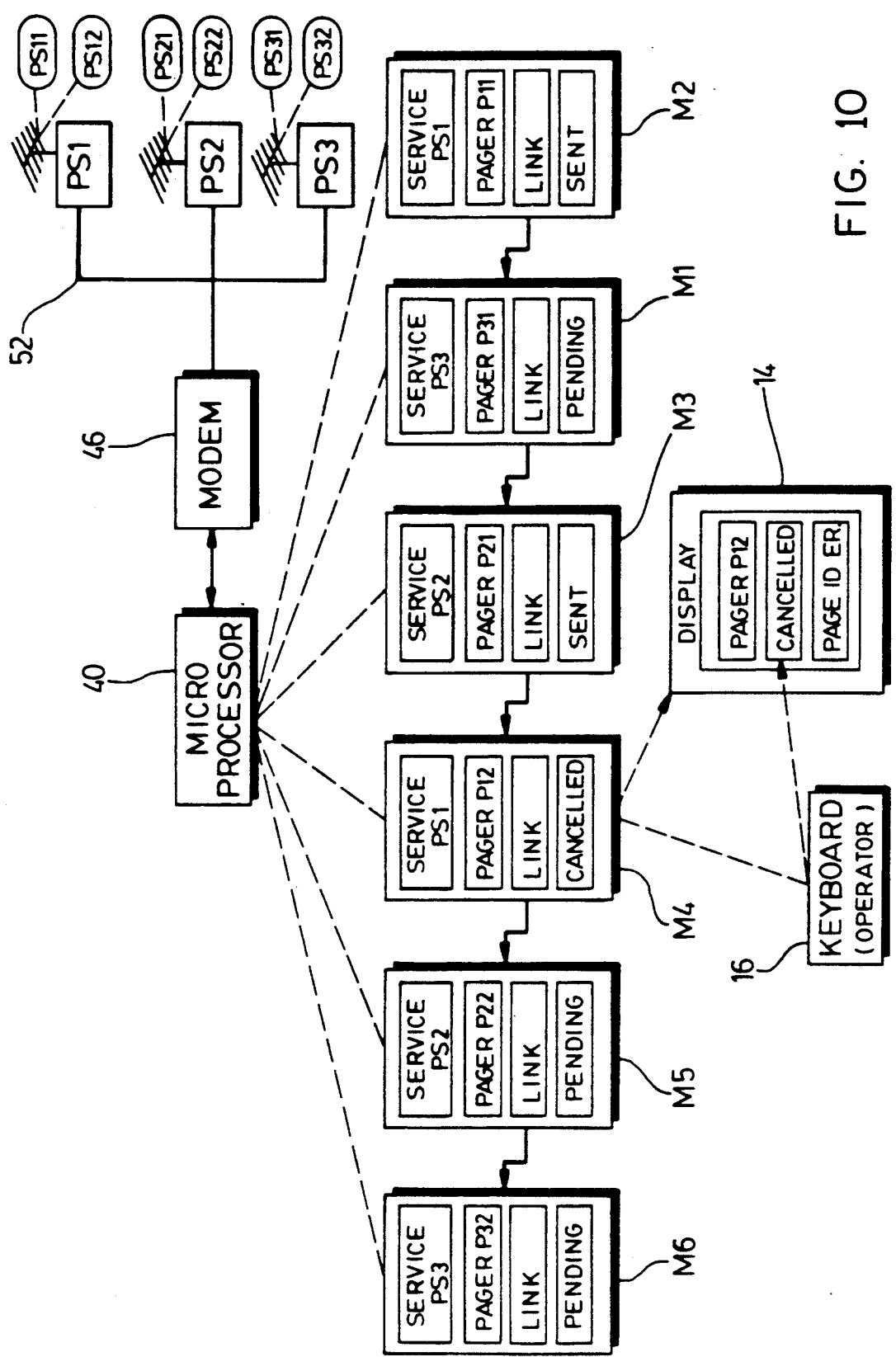
FIG. 10 is a diagrammatic representation of a message queue, paging services and pagers for which the messages are destined, and various components of the paging device.

Transmission of messages will be described with reference to FIG. 10. FIG. 10 diagrammatically illustrates the message queue 50, the microprocessor 40, the keyboard 16, the display 14, the modem 46, telephone lines 52 connecting the modem 46 to three paging services PS1-PS3, and pagers served by the services and identified as P11, P12, P21, P22, P31 and P32. The numeric parts of the pager references are two digits, the first digit corresponding to the associated paging service. In each message record of FIG. 10, only the communication control data (service and pager fields), the status data, and the link field of each record is presented. The data has been represented in a manner that highlights associations between messages, pager and services, and would not actually be stored in such form in the message records.

The microprocessor 40 scans the message queue 50 starting with the first message M1, which is located with the queue pointer, and proceeding to succeeding message records by relying on the relevant link field data contained in each message record. The first message M1 has a sent status and is consequently ignored. The microprocessor 40 selects the first message record whose status data indicates a pending status. In the sample queue 50 of FIG. 10, that is message M2. The microprocessor 40 retrieves the data in the pager service field of message M2, which identifies paging service PS3 by the sequence number of its pager service record. In response to that data, the microprocessor 40 retrieves from the paging service file the record for the paging service PS3. In response to the communication data contained in the paging service record, the microprocessor 40 programs the modem 46 (baud rate, word length, parity etc.) for communication with paging service PS3. The microprocessor 40 then selects one of the telephone numbers associated with the paging service. It causes the modem 46 to transmit the selected telephone number over the telephone lines 52. If a telephonic connection is created between the modem 46 and paging service PS3, the microprocessor 40 initiates the appropriate log-on and message transmission procedures, the instructions for which may be contained in the EPROM 42. The microprocessor 40 then causes the selected message M2 to be transmitted to paging service PS3. The microprocessor 40 waits for the modem 46 to report a standard acknowledgement of receipt of the message, and then updates the status field to indicate a sent status, and enters the time and date of transmission in the appropriate fields of message M2.

In response to the creation of the telephone connection, the microprocessor 40 enters a selective scanning mode. The microprocessor 40 scans through the rest of the messages in queue 50 for other messages whose transmission control data identify paging service PS3. In the hypothetical circumstances of FIG. 10, it locates the newly created record M6. The microprocessor 40 then causes the modem 46 to transmit the data associated with message record M6 to the paging service PS3 during the same communication session. Assuming that an acknowledgement of receipt of message M6 is received, the microprocessor 40 then updates the status of message record M6 to indicate a sent status, and enters the date and time of transmission, as before. Since the end of the queue 50 has been reached, the selective scan mode is discontinued.

The process of scanning through the message queue 50 from first to last message record to locate messages requiring transmission is then repeated. On the next scan, the message M2, whose status is now "sent" (status change not illustrated) is ignored. The microprocessor 40 encounters and selects message record M3, which is the first message in queue 50 that has a pending status. The paging service field of message M3 indicates paging service PS2. In response to that data, the microprocessor 40 retrieves the communication data for paging service PS2, and programs the modem 46 appropriately for communication with the particular pager service. It also causes transmission of a telephone number for the paging service PS2, and logs onto the pager service PS2. In response to the successful creation of a telephonic connection with paging service PS2, the microprocessor 40 enters its selective scanning mode. First, it initiates transmission of the message M3. Assuming an acknowledgement of receipt of the message M3 is received from the paging service PS2, the status field and the transmission date and time fields of message record M3 are updated accordingly. The microprocessor 40 then continues its selective scanning toward the end of the message queue 50, searching for other messages associated with paging service PS2 and having a pending status. It locates message M5, satisfying those criteria. The message M5 is then transmitted to paging service PS2 in a similar manner, with appropriate updating of its status, transmission date and transmission time fields. The scanning of the message queue 50 is thereafter continually repeated, but no messages with a pending status would be found and no transmission would be initiated, until either a new message is appended to the queue 50 or the status data associated with an existing message in the queue 50 is appropriately changed.

The paging device 10 is also adapted to handle a busy signal arising with attempts to create telephonic connections with a particular service. If a busy signal is detected by the modem 46, the modem 46 disconnects from the telephone line and reports the busy signal to the microprocessor 40. The microprocessor 40 then retrieves the data in the second telephone number field in the paging service record associated with the particular paging services, programs the modem 46 for transmission using the alternative line of the paging service, and causes the modem 46 to transmit the second number. It repeats these steps a predetermined number of times, as set in the general communication data. This repetitive process is terminated earlier if a telephonic connection is established between the modem 46 and the particular paging service.

Occasional transmission errors are to be expected. These may be characterized as general communication errors and a message-specific error (improper pager identification). Generally communication errors include absence of a dial tone, busy signals, and telephonic disconnection during transmission which is referred to herein as a "hang-up" condition. A hang-up condition can be an actual "HANG-UP" message (code according to IXO TAP protocols) from the paging service, indicating its intention to voluntarily break a telephonic connection, owing to some operational problem encountered by the paging service. A hang-up condition can also be created by the telephone system coupling the paging device 10 to a paging service, a temporary disruption of the telephonic connection. As regards individual messages, a number of messages are potentially return by a paging services. Transmission of an improper pager identification code is normally acknowledged with an "RS" (Reject System) message, coded according to IXO TAP protocols. Improper receipt of a message is generally acknowledged with a "NACK" (No Acknowledgment) message, basically requesting re-transmission. NACK messages are generally repeated a fixed number of times, and if transmission of a pager message still cannot be effected, a paging service will transmit a Hang-Up message, discontinuing the communication session. The remaining alternative is an "ACK" message, acknowledging receipt of a message. The operation of the paging device 10 can of course be modified to accommodate different protocols for handling and acknowledging messages.

General communication errors affect the automatic mode of the microprocessor 40 regulating transmission as follows. If the problem arises before a telephonic connection can be completed (e.g. no dial tone, repeated busy signals or repeated absence of a carrier), the microprocessor 40 in its automatic mode of operation changes the data of the currently selected message record to a rejected status, and stores the error message returned by the modem 46 (no dial tone, no carrier or busy signals) in the error message field of the affected message record. It does not enter its selective scanning mode, but proceeds to locate the next record whose status is pending and continues the general transmission process described above. On subsequent scans of the message queue 50, any record with a rejected status is skipped. If a general communication error arises subsequent to creation of a telephonic connection (e.g. a hand-up message or condition), the microprocessor 40 simply attempts to connect again to the particular service and to transmit the currently selected message, rather than assigning a rejected status and proceeding to the next record in the queue 50.

A message-specific problem error is handled essentially as follows. The microprocessor 40 will already have completed a telephonic connection and will have entered its selective scanning mode. If transmission of the message record currently selected for transmission results in an RS message, probably reflecting an improper pager identification code, the status field of the message record is set to identify a rejected status and the error message returned by the paging service is recorded in the error field. Optionally, and preferably, an error message may be drawn immediately to the attention of the operator to allow resetting of the status of the message. The microprocessor 40 remains in its selective scanning mode, proceeding through the rest of the message queue 50 to locate another message requiring transmission to the particular paging service.

Figure 11A:
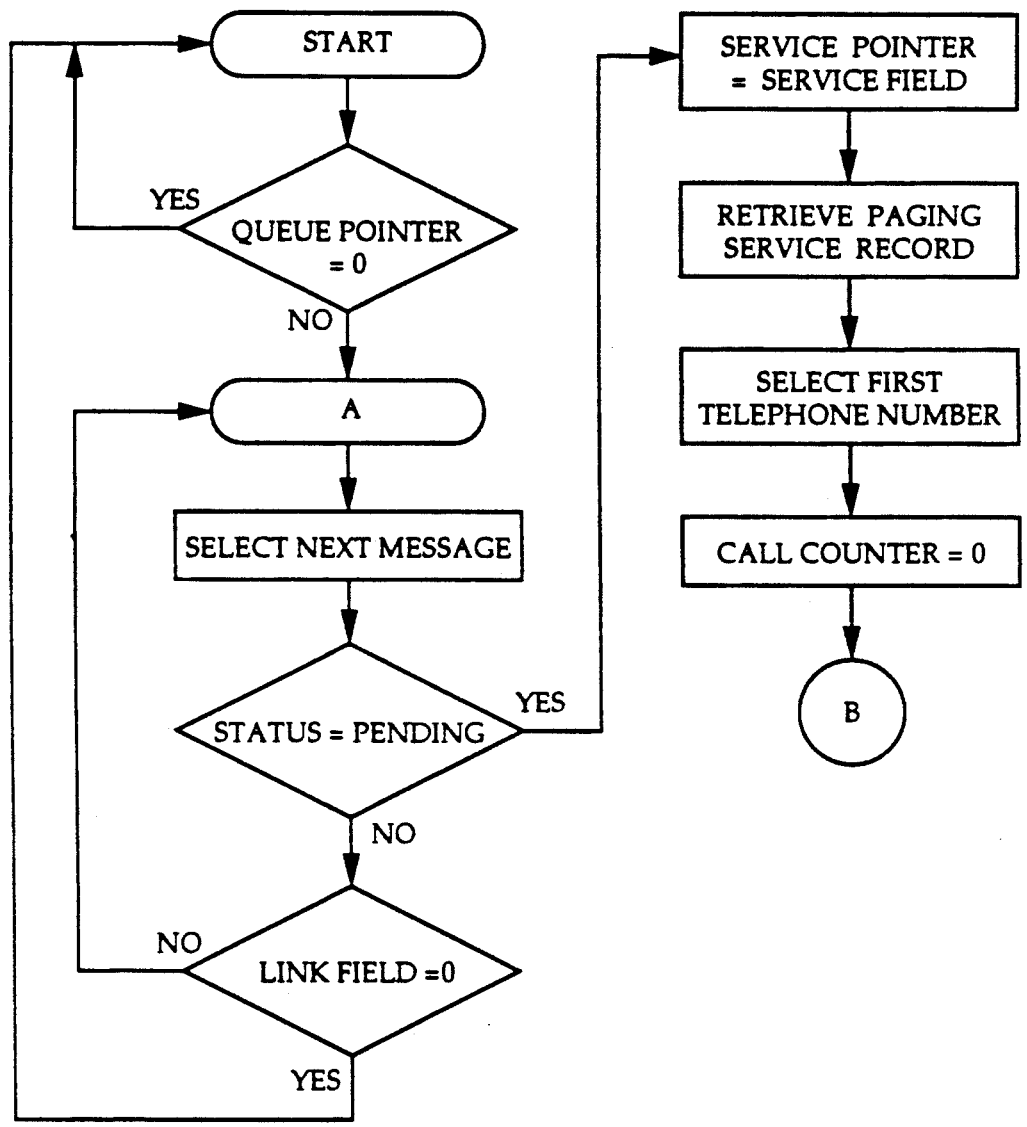
FIGS. 11a-11c are a flow chart indicating how transmission of messages in the queue is regulated.
Figure 11B:
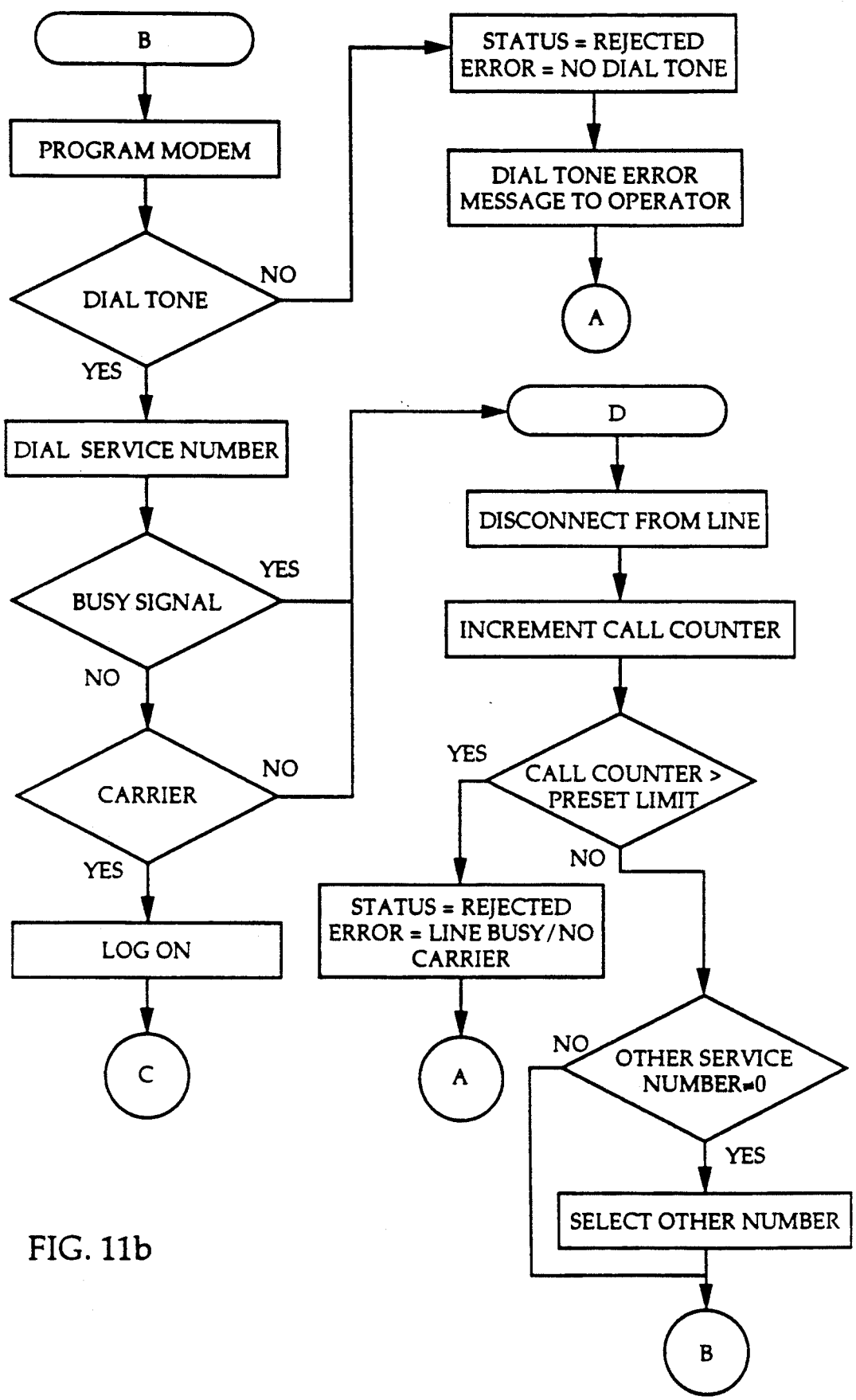
Figure 11C:
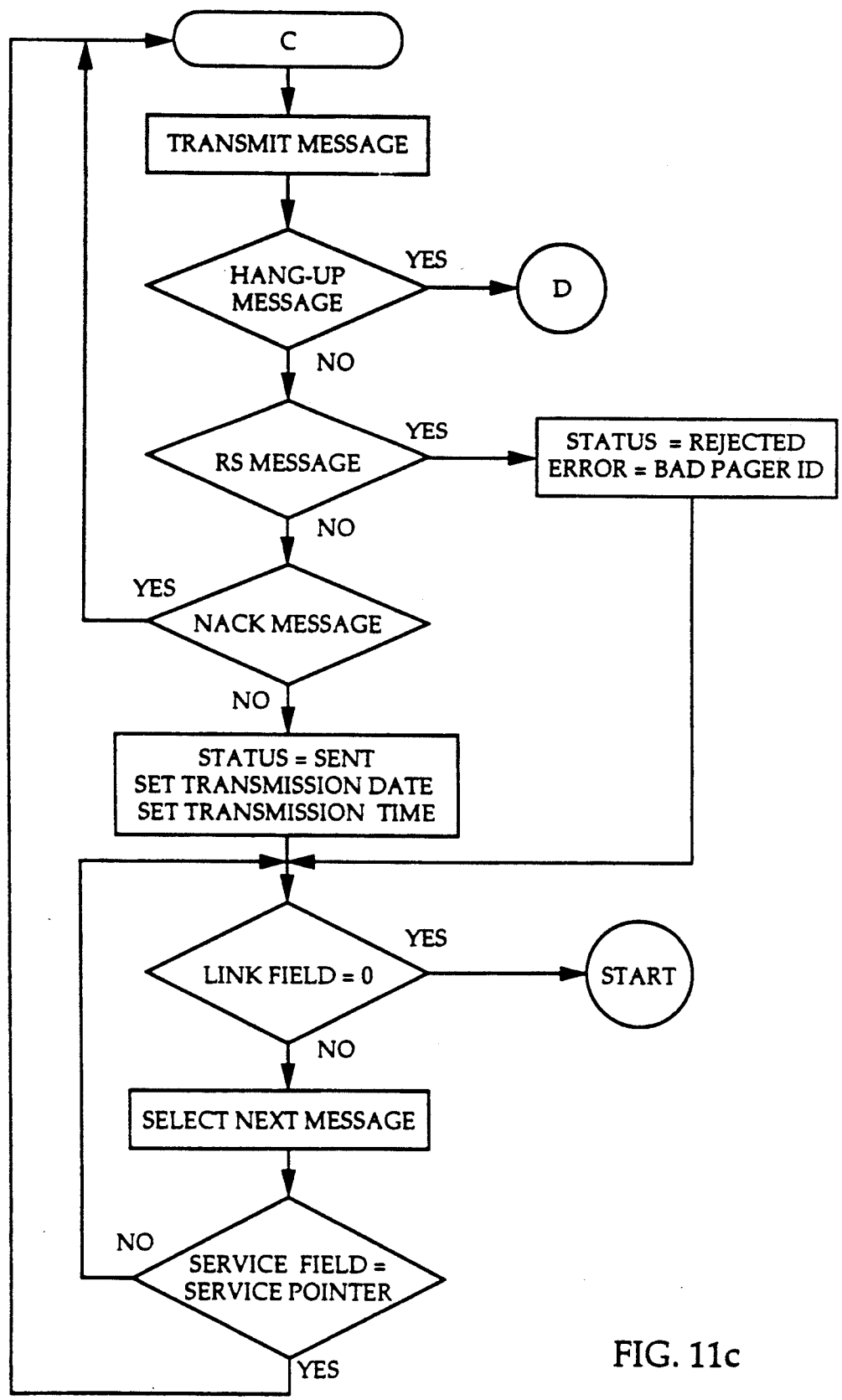

The overall process of handling transmission in the automatic mode of operation and accommodating transmission errors is shown in flow chart form in FIGS. 11a-11c. A number of matters respecting the flow chart should be noted. The starting point of the process has been identified with an oval box containing the word "START". Other "jump to" or continuation points in the procedure have been identified in a similar manner. Procedure branches that return to a jump-to point or proceed to a continuation point are terminated with circular boxes identifying the relevant point in the procedure. Rectangular boxes indicate operations and value assignments, and rhomboid boxes indicate testing of conditions ("IF statements"). All operations are performed on or with the currently selected paging message record, paging service record, or retrieved service telephone number. The "next message" in queue 50 when commencing from the start of the procedure is the first message in queue 50, as indicated by the queue pointer, if such a message exists. A null queue pointer indicates that no messages are in queue 50. Handling of busy signals and absence of a carrier have been shown as a common type of operation to reduce the size of the flow chart. A separate and substantially identical routine may be used in connection with the handling of absence of a carrier, to permit separate error messages to be generated for repeated busy signals and repeated carrier failures. HANG-UP messages, after log-on, are treated essentially as absence of a carrier signal.

Rejected messages are preferably drawn immediately to the operator's attention. Rejected message may be immediately displayed, in succession, including the message in its error field identifying the nature of the communication error. The operator may be constrained to enter, or given the option of entering, keyboard commands that immediately change the status of each affected message to either cancelled or pending. The latter would be appropriate, for example, where the reported transmission error is repeated busy signals or repeated inability to obtain a carrier from the paging service. Lack of a dial tone is preferably reported to the operator as a separate message before displaying rejected messages, advising the operator to check the connection of the paging device 10 to its associated telephone lines 52.

The operator can with appropriate commands retrieve and display on the LCD 14 any message in the message queue 50. This is graphically represented in FIG. 10, and screen layouts for message viewing and status modification are shown in FIG. 12. The message M4 is retrieved and reviewed. The message M4 is associated with pager P12, which is assumed to be in the possession of a hypothetical user, Susan Green. The operator can at his option reset the status of the message M4 to a pending status, to initiate re-transmission.

A screen of screens for message viewing and status changing is shown in FIG. 12. The initial screens correspond to those for message entry, leading to the screen offering paging, viewing and printing options. The operator enters the letter "V" to trigger message retrieval for the selected pager user Susan Green, pager P12 of FIG. 10. The microprocessor 40 scans the queue 50 to select all messages addressed to the selected pager. The operator can then scroll through the selection of messages using the next and previous keys. The operator may then select, for example, the message record M4. The status of each message may be indicated with single character symbols. For example, "X" may indicate a pending status; "*", a sent status; and "¢", a cancelled status. The operator can then alter the current status with a predetermined command such as the combination of the keyboard's control key and the letter "T". If the status is "cancelled" (as illustrated in FIGS. 10 and 12) or "sent", the microprocessor 40 presents a screen layout effectively asking for confirmation to change the status to "pending" (for re-transmission), as illustrated in FIG. 12. If the status of the record is "pending", the microprocessor 40 responds by presenting screens asking in an analogous manner for confirmation to change the status to "cancelled" (not illustrated). If immediate processing of rejected messages is not required, then a single character code for a rejected message can be displayed, and the rejected message can be processed in a manner similar to cancelled or sent message records. The operator is not permitted to change the status of a pending message to sent or rejected. In response to operator specification of a new status, the microprocessor 40 alters the status data associated with the message M4 accordingly.

Messages in the queue 50 will ultimately have to be deleted to free SRAM for new messages. The automatic mode of operation regulating transmission may be interrupted for record deletion. Any message record may be deleted from the queue 50 by appropriately changing the link field of a preceding message record to point to the address in SRAM 44 of the immediately succeeding record. If the first message record is to be deleted, the SRAM address pointing to the first message record is simply to changed to point to the second message record. If the last message in the queue 50 is to be deleted, the link field of the second last record is simply voided. Locations for new records can be assigned using conventional techniques for locating free blocks of memory sufficient to accept the new records.

The basic functions of the automatic and operator-controlled mode of operation are integrated through the status fields associated with the queued messages. In the automatic mode of operation, the microprocessor 40 repeatedly scans the message queue 50 from beginning to end, effectively acting on the status data of each message record and updating the status data as transmissions are attempted. The operator-controlled mode does not immediately initiate or suppress transmission of messages. The operator in essence changes status data associated with the queued messages, allowing the automatic mode of operation to react accordingly. The last step in storing a new message is updating the link field of the last message in the queue 50 to point to the new message. Simultaneous read and write operations to SRAM 44 by the two concurrent procedures can be avoided with conventional multitasking techniques. If a new message is added while the last message in queue 50 is being processed for potential transmission, then depending on when the link field of the last message is read in the automatic mode, the new message will be immediately processed or the repeated scanning of the message queue 50 will begin again with the first message then in queue 50.

Figure 13:
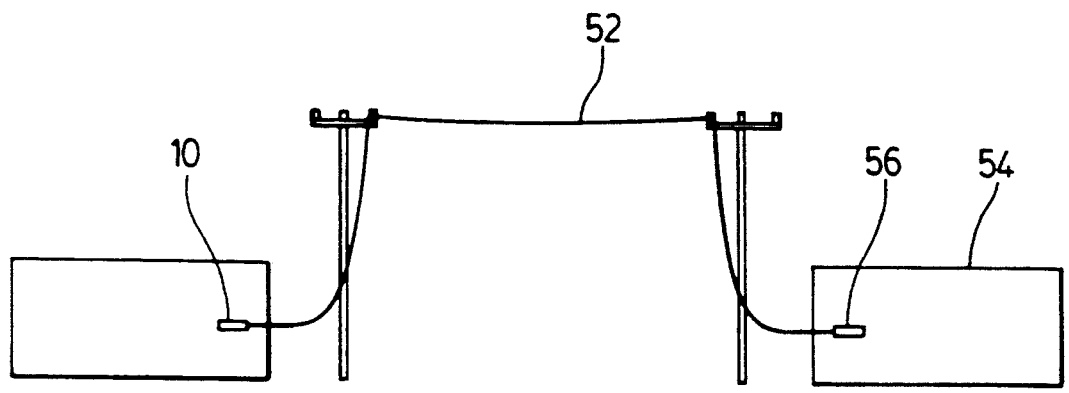
FIG. 13 schematically illustrates an arrangement for servicing the paging device from a remote service center to reconfigure communication data contained in the paging device.

Communication data in the SRAM 44 of the paging device 10 can be reconfigured, remotely over telephone lines 52, by a service center 54 which has a substantially identical device 56. The physical arrangement for such servicing is illustrated in FIG. 13. The paging device 10 has particular data-transmitting and data-receiving modes for such purposes. The identical paging device 56 at the service center 54 of course has similar modes of operation. These modes of operation will be discussed below in the context of actual remote servicing of the paging device 10.

Figure 18:
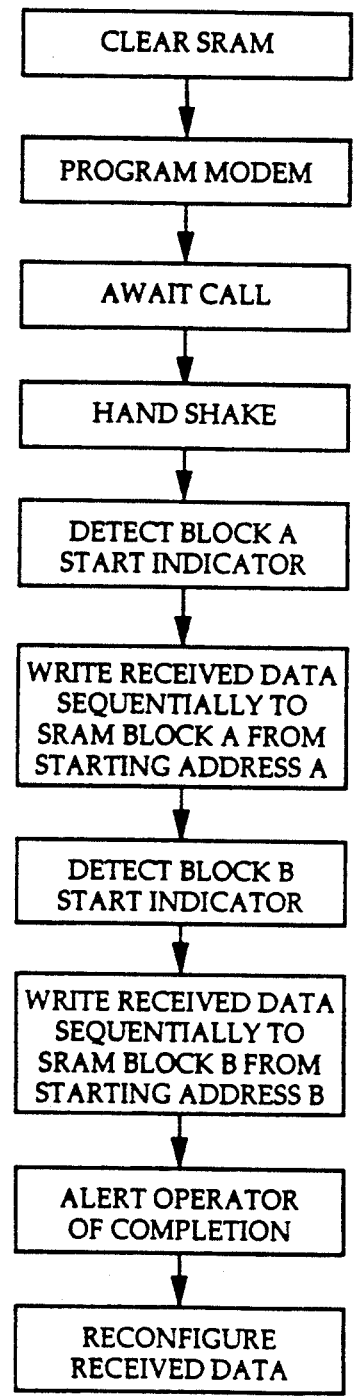

As a preliminary step, the service center device 56 is placed in the data-receiving mode. The screen sequences used to initiate that mode of operation and complete receipt of data are illustrated in FIG. 15, and the procedure followed at the service center 54 is indicated in the flow chart of FIG. 18. From the initial screen layout configured for message creation, a command code is entered by an operator at the keyboard of the service center device 56, specifically, "@Clear", which conditions the microprocessor 40 of the service center device 56 to clear all messages and communication data from its SRAM. It presents a confirmation screen and in response performs the deletion. Deletion of messages is the primary purpose of this operation. The operator then enters a predetermined command, specifically "@ANSWER", and the microprocessor 40 assumes its data-receiving mode. The modem associated with the service center device 56 is appropriately programmed and its microprocessor 40 conditioned to await a telephonic connection to be initiate by the user's paging device 10.

Figure 17:
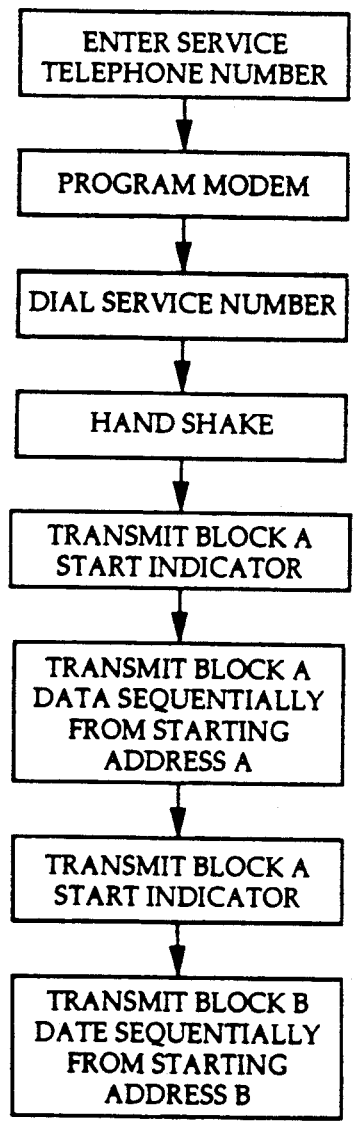
FIG. 17 is a flow chart illustrating the principal steps in the transmission of communication data from the paging device of FIG. 1 to the service center; and, FIG. 18 is a flow chart illustrating the principal steps in the receipt of the transmitted communication data for reconfiguration at the service center.

The user's paging device 10 is placed in its data-transmitting mode. The screen sequences for such data transmission are shown in FIG. 16, and a flow chart of the underlieing procedure is illustrated in FIG. 17. Starting with the initial message entry screen for message creation, the user enters a predetermined command, such as "@CALL". The microprocessor 40 then presents a screen layout prompting entry of a telephone number. The telephone number for the service center device 56 is then entered. Upon pressing the enter button, the microprocessor 40 causes the modem 46 to create a telephonic connection with the service center device 56. That involves transmitting the telephone number of the service center 54 and performing customary handshaking. The necessary communication protocol (log-on procedures, baud rate, parity, etc.) for such service communication is preprogrammed and contained in the EPROM 42. Once the connection is made, the microprocessor 40 of the user's paging device 10 retrieves the communication data from its SRAM 44 and transmits the communication data according to a predetermined communication protocol, such as XMODEM with error checking. First, it transmits an indicator indicating that it is beginning transmission of block A of SRAM 44, its paging service file. It then transmits the data contained in block A sequentially from the starting address A. The service center device 56 responds to the indicator by commencing writing the received data sequentially to its corresponding SRAM block A starting at the corresponding address A. The user's paging device 10 then transmits an indicator indicating that it is beginning to transmit block B of SRAM 44, its pager file. Once again, it transmits the data contained in its block B sequentially from the starting address B. The service center device 56 responds to the indicator by commencing writing the received data sequentially to its corresponding SRAM block B at address B in its SRAM. A screen may be presented that adds a succession of characters such as "+" to indicate to the user progress in data transmission.

Programming of the general communication functions required for the data-receiving and data-transmitting modes is largely conventional matters. However, the following aspects are to be noted. First, for each of the paging service and pager files, the entire fixed-length block of SRAM dedicated to the file is transmitted, including empty memory locations. The data is transmitted beginning at the starting address of the relevant block sequentially to the end of the block. At the service center device 56, the data is sequentially rewritten to identical SRAM blocks beginning at the same starting addresses as in the user's paging device 10. Basically, a mirror-image of the data files in the user's paging device 10 is reconstructed in the service center device 56 at identical memory addresses, as indicated in FIG. 14. The service center device 56 is immediately conditioned to operate on the received communication data.

If the user has reported, for example, an inability to communicate with a new paging service, the service center 54 can use the procedure described above regarding data entry and editing of service data information to check the specified communication protocol with the service center device 56. Corrections can be made, for example, to faulty baud rates, parity, word length, or like matters. The communication protocol can be checked by attempting transmission to the particular paging service, addressing known pagers, for example, actually within the service center 54. Similarly, if the user does not want to enter paging service data for a new service, this can be done with the service center device 56, augmenting the received data. Similarly, data entered for a pager can be checked and corrected.

Once the received communication data is reconfigured, the data-transmission modes of the two paging devices are reversed. This will normally be coordinated by voice communication. First, the communication data in the user's paging device 10 is cleared following the procedure described above. Then the user's device 10 is placed in its data-receiving mode, awaiting a call from the service center device 56. The service center device 56 is then placed in its data-transmitting mode, following the procedures described above. The telephone number for the user's paging device 10 is entered in the service center device 56, which then transmits the telephone number and creates a telephonic connection with the user's paging device 10. The service center device 56 then transmits the reconfigured communication data to the user's paging device 10, which assembles a mirror-image of the reconfigured data at the appropriate memory locations in its SRAM. The user's device 10 is then configured for immediate communication. This arrangement very significantly reduces service costs and down-time for the user's paging device 10.

A similar procedure can be followed to transfer communication data from the paging device 10 to the substantially identical paging device 30 shown in FIG. 2. The RS-232 ports of the devices are simply connected with the null modem adaptor 28, and telephonic connection is unnecessary.

Communication data is of course stored in SRAM. A back-up power supply may be provided to preserve the data during power failures, but it is advisable to store a relatively permanent copy. To that end, the data-transmitting and data-receiving modes may be adapted to transmit and receive data via the RS-232 port 24 to a storage device. That may be a disk drive itself, or the personal computer 26 as illustrated in FIG. 1 which will normally being associated with a disk drive. Except that telephonic connection are not required, the procedures involved are analogous to those described above for transmissions to and from service center 56. The conventional data transfer protocols appropriate for data transfer to a disk drive or personal computer 26 are observed. A data file is created in the storage device which is essentially a mirror image of the data blocks dedicated to the paging service and pager files. No attempt is made, however, to locate the data at any particular starting address in the storage device, as the storage device will not normally be adapted to process the received data. During transfer of the stored communication data back to the paging device 10, its SRAM blocks containing its paging service and pager files are first cleared. The data in the stored device is retrieved sequentially in the same order as originally transmitted, and written sequentially to the SRAM blocks containing the paging service and pager files.

It will be appreciated that particular embodiments of the invention have been described and that modifications may be made therein without departing from the spirit of the invention or necessarily departing from the scope of the appended claims.

I claim:

1. For a remotely-located device that transmits text messages with a programmable modem over telephone lines to a paging service that serves pagers and observes a particular communication protocol, the device using communication data stored in storage means associated with the device to communicate with the paging service and being programmed to permit entry and editing of the communication data, the communication data comprising at least paging service data identifying the communication protocol of the paging service, a method of reconfiguring the communication data of the remotely-located device to correct transmission problems associated with faulty communication data or to meet operator communication requirements, the method comprising:

telephonically connecting the remotely-located device via its modem with a device at the service center;
   operating the remotely-located device to retrieve from its associated storage means the communication data and to transmit the retrieved communication data according to a predetermined communication protocol via its modem over telephone lines to the telephonically-connected service center device;
   storing the received communication data in storage means associated with the service center device;
   reconfiguring the received communication data with the service center device;
   telephonically connecting the service centre device with the remotely-located device after reconfiguring the received communication data;
   transmitting the reconfigured communication data from the service centre device over telephone lines to the telephonically-connected remotely-located device; and,
   operating the remotely-located device to store the reconfigured transmitted communication data in the storage means associated with the remotely-located device for later use by the remotely-located device for communication with the paging service.

2. The method of claim 1 in which:
   the remotely-located device is programmed for operator recording of the paging service data in a predetermined block of storage locations of predetermined size at a predetermined location in the storage means of the remotely-located device;
   the service center device operates substantially identically to the remotely-located device;

the retrieval and transmission of the paging service data from the remotely-located device comprises sequentially retrieving and transmitting the paging service data from the predetermined location in the storage means of the remotely-located device;

the storing of the received paging service data by the service center device comprises storing the received paging service data sequentially in a block of storage locations at the same predetermined location in the storage means of the service center device;

the transmission of the reconfigured paging service data from the service center device comprises sequentially retrieving and transmitting the reconfigured paging service data from the predetermined location in the storage means of the service center device; and, the storing of the reconfigured, transmitted paging service data by the remotely-located device comprises storing the reconfigured, transmitted paging service data sequentially in a block of storage locations at the predetermined location in the storage means of the remotely-located device.

3. A device for sending text messages destined for pagers over telephone lines to a paging service serving the pagers, comprising:

input means comprising a keyboard;
a display;
storage means for storing data in digital form;
a modem;
control means coupled to the input means, the display, the storage means and the modem;

the control means comprising an operator-controlled mode of operation and a concurrent automatic mode of operation, the control means being programmed for the operator-controlled mode of operation:

(a) to permit an operator with the input means to compose messages on the display and to associate each of the composed messages with any one of the pagers; and, (b) to store each of the composed messages in a message queue in the storage means together with transmission data identifying the associated pager and status data associating a predetermined status with the message, the predetermined status being one of a set of predetermined statuses including a transmit status and a transmitted status;

the control means being programmed for the automatic mode of operation:

(d) to repeatedly scan the message queue to identify messages whose status data indicates a transmit status;

(e) to transmit via the modem over the telephone lines to the paging service each of the identified messages; and, (f) to alter the status data of the identified messages to associate therewith a transmitted status.

4. The device of claim 3 in which the control means are programmed for the operator-controlled mode of operation to permit the operator to view any one of the stored messages on the display and to alter the status data of the stored message to associate a different one of the predetermined statuses with the stored message.

5. The device of claim 3 in which:

the control means are programmed to retrieve from the storage means paging service data comprising a plurality of telephone numbers for communication with the paging service; and, the control means are programmed to control telephonic connection of the programmed modem with the paging service by:

(1) selecting one of the plurality of telephone numbers;

(2) transmitting the selected telephone number with the programmed modem over the telephone lines thereby to initiate telephonic connection of the programmed modem to the paging service;

(3) detecting whether a busy signal is generated on the telephone lines in response to transmission of the selected telephone number;

(4) responsive to detection of the busy signal, decoupling the modem from the telephone lines and selecting a different one of the plurality of telephone numbers; and, (5) repeating steps (1) through (4) for a predetermined number of times and terminating the repeating of the steps if the programmed modem connects telephonically to the paging service.

6. The device of claim 3 in which the control means are programmed to retrieve from the storage means communication data comprising paging service data identifying the communication protocol and at least one telephone number of the paging service and comprising pager data identifying data required by the paging service to identify each of the pagers for communication therewith and in which the control means have a predefined data-transmitting mode and are programmed to respond to a predetermined command generated by operator operation of the input means to assume the data-transmitting mode, the control means being programmed for the data-transmitting mode to:

control the input means and the display such that the operator can with the input means specify a telephone number for a remote device programmed to receive communication data stored in the storage means;

control the modem to telephonically connect the modem over telephone lines to the remote device;

retrieve the communication data from the storage means after telephonic connection of the modem to the remote device; and, transmit the communication data according to a predetermined communication protocol over the telephone lines to the remote device.

7. The device of claim 6 in which the control means have a predefined data-receiving mode and are programmed to respond to a predetermined command generated by operator operation of the input means to assume the data-receiving mode, the control means being programmed for the data-receiving mode to:

program the modem to receive communication data according to a predetermined communication protocol from a remote device that telephonically connects to the modem over telephone lines; and, store the received communication data in the storage means for retrieval by the control means in connection with the creation of messages.

8. The device of claim 3 adapted to transfer communication data stored in the storage means to and from a substantially identical device, the device comprising a data transfer port for transferring data to and from the substantially identical device, the control means being programmed to:

respond to predetermined operator commands generated at the input means by retrieving the communication data stored in the storage means and transmitting the retrieved communication data in a predetermined format to the data transfer port; and, respond to predetermined operator commands generated at the input means by receiving communication data in a predetermined format and storing the received communication data in the storage means for later retrieval by the control means in connection with the creation of messages.

9. The device of claim 8 in which the control means are programmed for the transmission of each of the messages to:

detect a message transmitted by the paging service to the device indicating that any one of the messages has been rejected by the paging service; and, alter the status data of the rejected message to associate a rejected status with the message thereby to suppress further transmission of the message in the automatic mode of operation.

10. The device of claim 8 in which the control means are programmed for the transmission of each of the messages to:

transmit a telephone number of the paging service up to a predetermined number of times;

detect a busy signal on the telephone lines responsive to each transmission of a telephone number of the paging service; and, alter the status data of the message to associate a rejected status with the message in response to detection of the busy signal the predetermined number of times thereby to suppress further transmission of the message in the automatic mode of operation.

11. A method of sending text messages destined for pagers with a programmable modem over telephone lines to a plurality of paging services serving the pagers and observing different communication protocols, comprising:

storing communication data in digital form in a storage medium, the communication data comprising paging service data identifying for each of the paging services its communication protocol and at least one telephone number for the paging service and comprising pager data identifying for each of the pagers one of the paging services serving the pager and data required by the one paging service to identify the pager for communication therewith;

composing the messages with input means comprising a keyboard;

operating the input means in response to the stored communication data to generate for each of the messages transmission control data associating the message with a particular pager and the paging service serving the particular pager;

storing each of the composed messages and its associated transmission control data in digital form in a message queue in the storage medium thereby creating a queue of messages associated with different ones of the paging services;

transmitting the messages in the message queue to the associated paging services, the transmission comprising repeatedly:

(a) selecting an untransmitted message in the message queue and identifying from its associated stored transmission control data the particular paging service associated with the selected message;

(b) identifying among the messages in the message queue other untransmitted messages for which the associated stored transmission control data also identify the particular paging service;

(c) programming the modem for transmission to the particular paging service in response to the transmission control data associated with the selected message and the stored paging service data for the particular paging service; and, (d) communicating with the particular paging service via the programmed modem to transfer the selected message and the other identified messages in succession to the particular paging in a single communication session.

12. The method of claim 11 comprising an operator-controlled mode of operation and a concurrent automatic mode of operation:

the operator-controlled mode of operation comprising the creation and storage of the messages, the creation and storage of the messages including storing status data together with each of the composed messages indicating a transmit status;

the automatic mode of operation comprising the transmission of the messages, the transmission comprising altering the status data of each of the transmitted messages to indicate a transmitted status.

13. The method of claim 12 in which the operator-controlled mode of operation comprises displaying on the display messages whose status data indicates a transmitted status and modifying the stored status data of the displayed messages to indicate a transmit status thereby to reinitiate transmission of the messages in the automatic mode of operation.

14. The method of claim 11 comprising the preliminary step of:

coupling the device through a data transfer port to a storage device containing the communication data;

operating the device to retrieve the communication data from the storage device; and, storing the communication data retrieved from the storage device in the storage medium for retrieval during the creation of the messages.

15. The method of claim 11 in which the paging service data comprises a plurality of telephone numbers for communication with a particular one of the paging services, the communication with the particular paging service comprising:

(1) selecting one of the plurality of telephone numbers;

(2) transmitting the selected telephone number with the programmed modem over the telephone lines thereby to initiate telephonic connection of the programmed modem to the particular paging service;

(3) detecting whether a busy signal is generated on the telephone lines in response to transmission of the selected telephone number;

(4) responsive to detection of the busy signal, decoupling the modem from the telephone lines and selecting a different one of the plurality of telephone numbers;

(5) repeating steps (1) through (4) for a predetermined number of times and terminating the repeating of the steps if the programmed modem connects telephonically to the particular paging service.

16. The method of claim 11 comprising the preliminary steps of:
   programming the modem for telephonic communication with a remote device according to a predetermined communication protocol;
   telephonically connecting the modem with the remote device over telephone lines;
   receiving at least part of the communication data from the remote device over the telephone lines; and,
   storing the received communication data in the storage medium for retrieval during the creation of the messages.

* * * * *